United States Patent [19]

Guilino et al.

[11] 4,315,673
[45] Feb. 16, 1982

[54] PROGRESSIVE POWER OPHTHALMIC LENS

[75] Inventors: Günther Guilino, Munich; Rudolf Barth, Höhenkirchen, both of Fed. Rep. of Germany

[73] Assignee: Optische Werke G. Rodenstock, Munich, Fed. Rep. of Germany

[21] Appl. No.: 147,267

[22] Filed: May 5, 1980

Related U.S. Application Data

[63] Continuation of Ser. No. 27,813, Apr. 6, 1979, abandoned.

[30] Foreign Application Priority Data

Apr. 6, 1978 [DE] Fed. Rep. of Germany ....... 2814916

[51] Int. Cl.³ .............................................. G02C 7/06
[52] U.S. Cl. ............................................. 351/169
[58] Field of Search .............................. 351/168–172, 351/177

[56] References Cited

U.S. PATENT DOCUMENTS

| | | | |
|---|---|---|---|
| 2,878,721 | 3/1959 | Kanolt | 351/169 |
| 3,910,691 | 10/1975 | Maitenaz | 351/169 |
| 4,055,379 | 10/1977 | Winthrop | 351/169 |
| 4,056,311 | 11/1977 | Winthrop | 351/169 |
| 4,062,629 | 12/1977 | Winthrop | 351/169 |
| 4,240,719 | 12/1980 | Guilino et al. | 351/169 |

FOREIGN PATENT DOCUMENTS

| | | |
|---|---|---|
| 2610203 | 9/1977 | Fed. Rep. of Germany ...... 351/169 |
| 2058499 | 5/1971 | France . |
| 2344043 | 10/1977 | France . |
| 1295504 | 11/1972 | United Kingdom . |
| 1403675 | 8/1975 | United Kingdom . |
| 1484382 | 9/1977 | United Kingdom . |

*Primary Examiner*—John K. Corbin
*Assistant Examiner*—Scott J. Sugarman
*Attorney, Agent, or Firm*—Toren, McGeady & Stanger

[57] ABSTRACT

In the disclosed lens, one lens surface is divided into an upper distance-vision portion FT, a lower near-vision portion NT, and a varying or transitional region PB between the two other portions. In the upper distance-vision portion, the surface contains a far reference point $B_F$ and exhibits predetermined average distance-vision surface refractive powers $\overline{D}_F$. The lower near-vision portion contains a near-vision reference point $B_N$ and has predetermined average near-vision surface refractive powers $\overline{D}_N$. The transitional region exhibits average surface refractive powers $\overline{D}_P$ which effect a smooth transition from the distance-vision portion to the near-vision portion. The surface is divided into a temporal portion and a nasal portion by a principal meridian M which forms an umbilical line.

20 Claims, 16 Drawing Figures

FIG.1
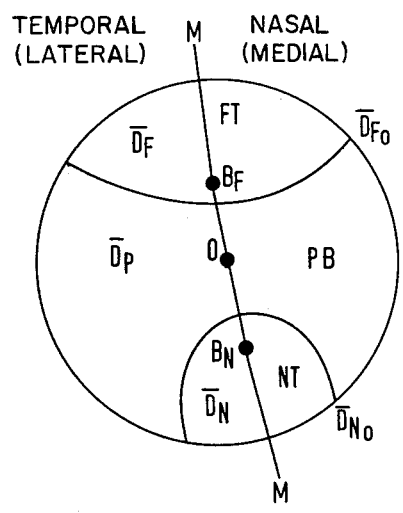
FIG.2
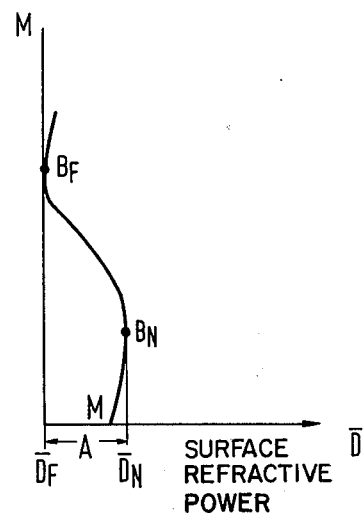
FIG.3   FIG.3A   FIG.3B
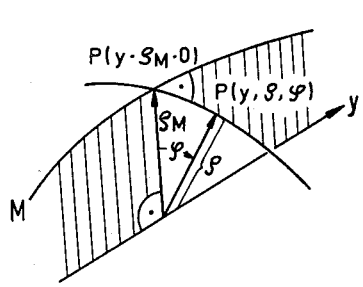
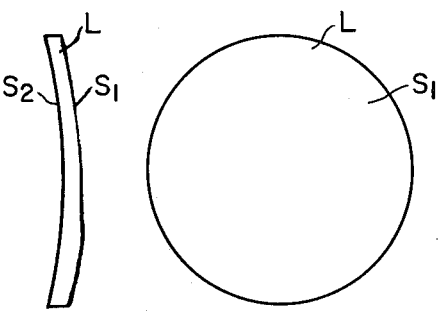

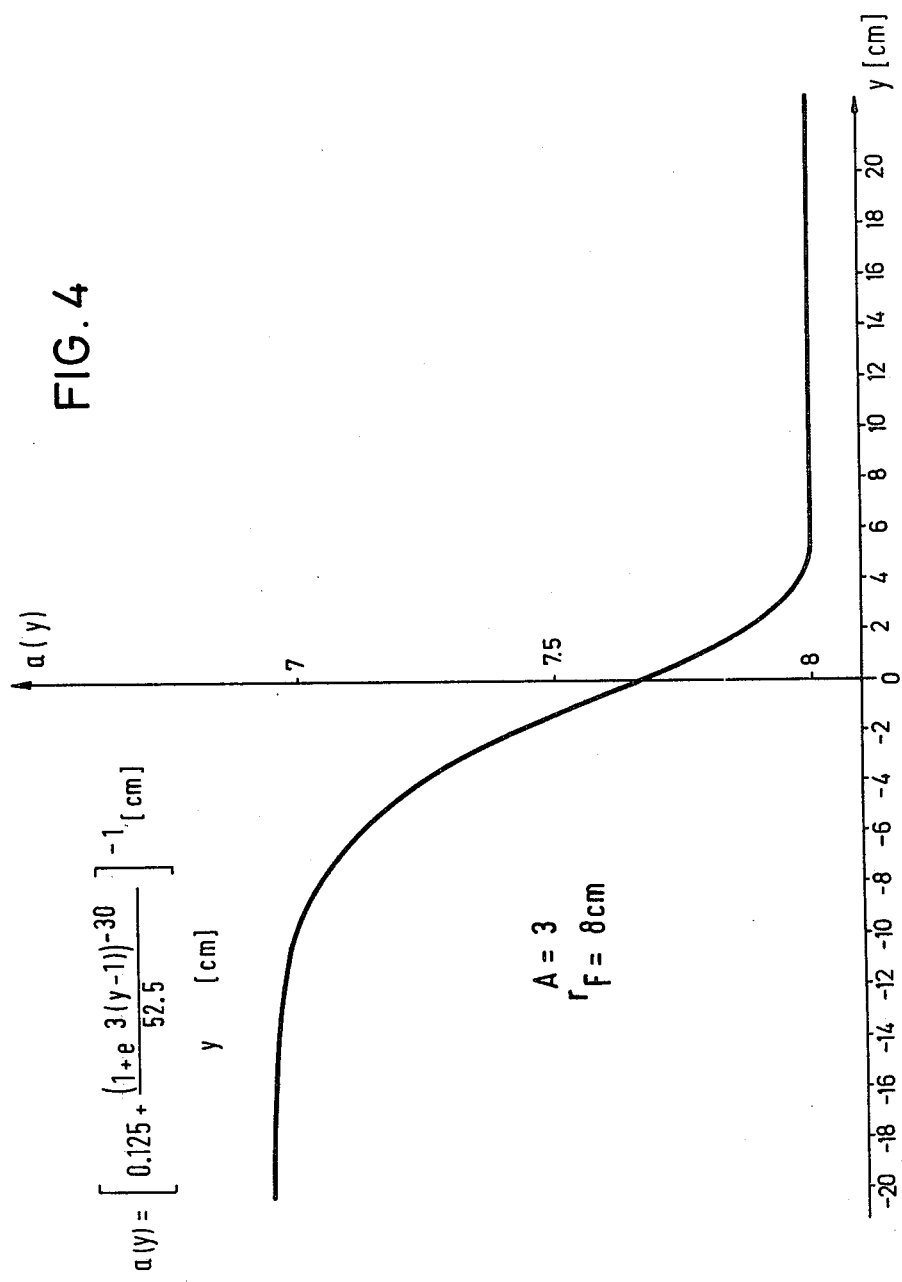

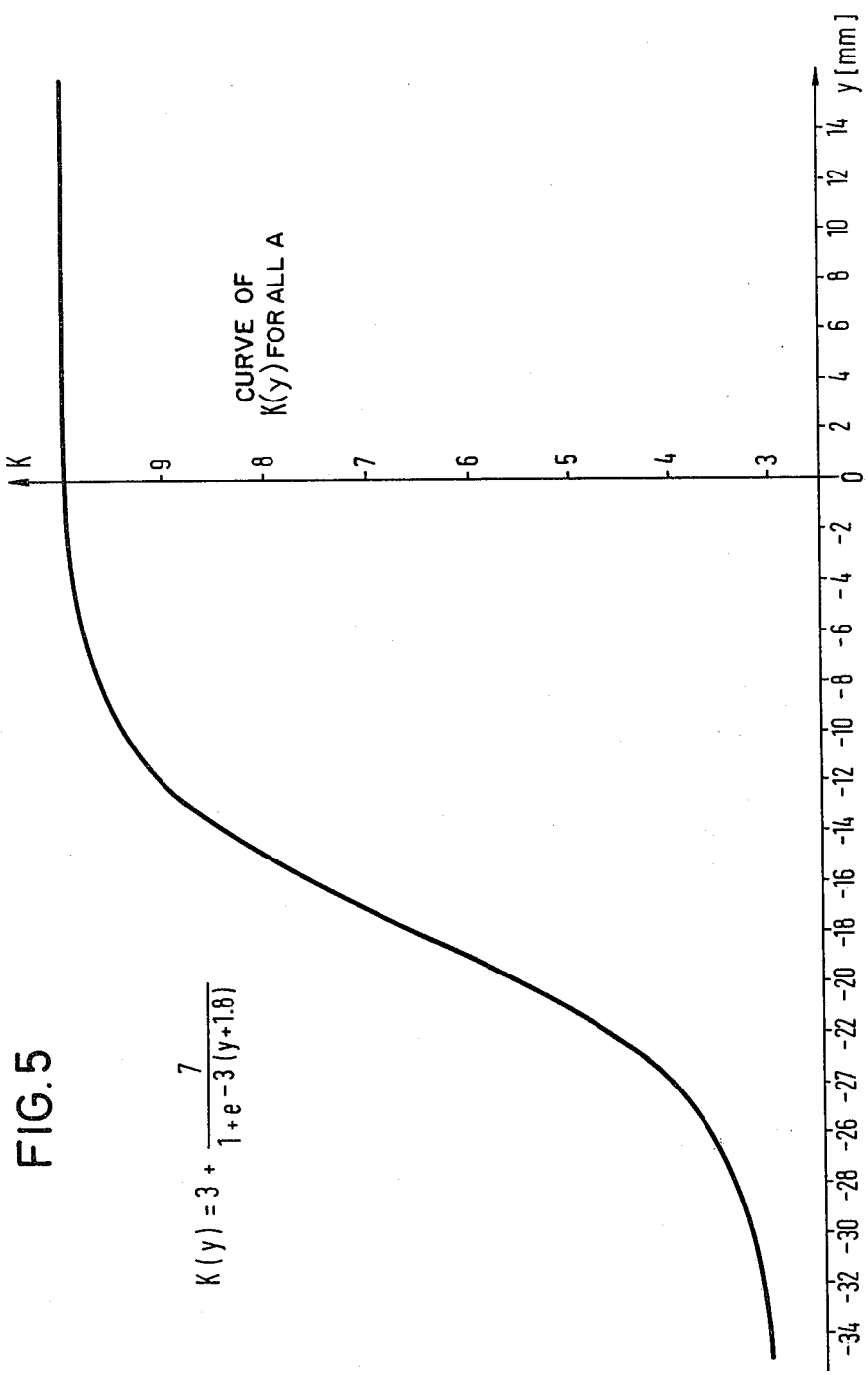

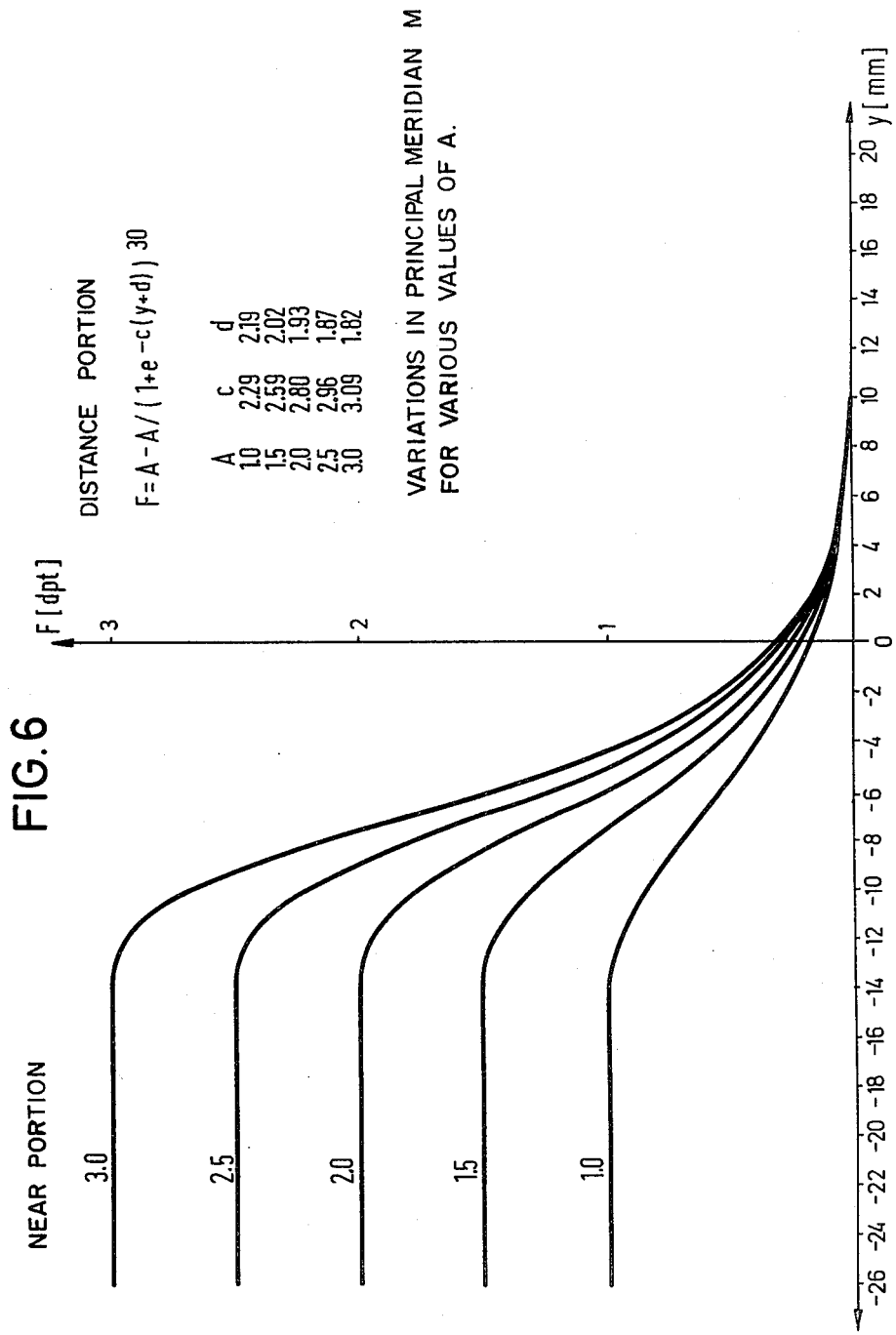

PROGRESSIVE POWER OPHTHALMIC LENS

This is a continuation of application, Ser. No. 027,813, filed Apr. 6, 1979 now abandoned.

BACKGROUND OF THE INVENTION

This invention relates to lenses for eyeglasses, and particularly to bi or multi focal lenses.

Known lenses of this type include a surface having an upper distance-vision portion or distance portion FT, a lower near-vision portion or near portion NT and a varying or progressional or transitional region PB between the two portions. The near portion is sometimes called the "add".

In the upper distance portion FT the surface contains a far reference point $B_F$ and exhibits predetermined average distance-vision surface refractive powers $\overline{D}_F$. The lower near portion NT, containing a near reference point $B_N$ in accordance with DIN 58208, has predetermined average near-vision surface refractive powers $\overline{D}_N$. The transitional region PB has average surface refractive powers $\overline{D}_P$ which effect a smooth transition from the distance portion FT to the near portion NT. The surface is divided into a temporal portion and a nasal portion by a principal meridian M which forms an umbilical point line.

An object of the invention is to provide a surface for such a lens for eyeglasses which has the following properties:

(a) a large, almost spherical, distance-vision portion in which the effect varies, at most, ±0.1 diopters, (b) a large, also almost spherical, near-vision portion, in which the effect varies, at most, ±0.1 diopters, (c) a progression region whose peripheral surface astigmatism is small and whose average effect in the horizontal direction exhibits only a small gradient and whose length along the principal meridian is approximately 18 mm.

The terms used in this application, the prior art, the objects of the invention, features of the invention, the advantages of these features, and details of preferred embodiments can be best understood from the following description when read in light of the drawings:

BRIEF DESCRIPTION OF THE DRAWINGS

In the drawings:

FIG. 1 is a diagram illustrating the lens surface with a circular boundary and a center point 0.

FIG. 2 is a graph illustrating the surface refracted power along the principal meridian of FIG. 1.

FIG. 3 is a diagram illustrating the surface of FIG. 1.

FIGS. 3A and 3B are drawings illustrating a lens embodying the invention.

FIG. 4 is a graph of characteristics of surfaces embodying the invention.

FIG. 5 is a graph of other characteristics of surfaces embodying the invention.

FIG. 6 is a graph of other characteristics of surfaces embodying the invention.

DETAILED DESCRIPTION OF THE DRAWINGS

Figure 7:
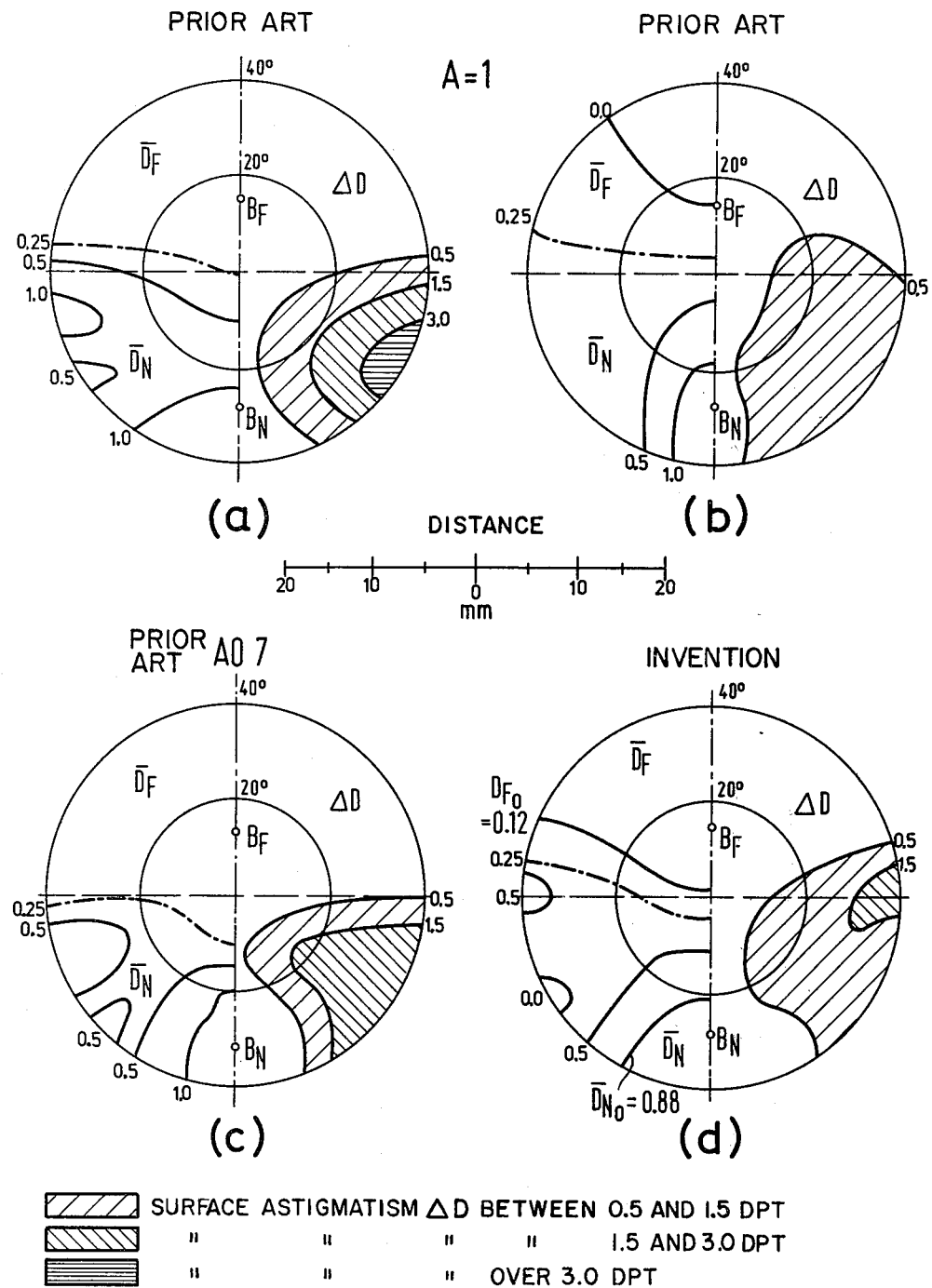
FIGS. 7a, 7b, 7c, and 7d are diagrams comparing known lens surfaces in FIGS. 7a, 7b, 7c with a surface, shown in FIG. 7d embodying the invention.

FIG. 1 shows a lens surface with a circular boundary and a center point 0. In an upper distance-vision, or distance, portion FT containing a far reference point $B_F$ in accordance with German industrial standard DIN 58208 this surface has predetermined average distance portion surface refractive powers $\overline{D}_F$. In a lower near-vision, or near, portion NT containing a near reference point $B_N$ in accordance with German industrial standard DIN 58208 this surface has predetermined average near portion surface refractive powers $\overline{D}_N$. In a varying or transitional or progression region PB located between the distance portion FT and the near portion NT the surface has average surface refractive powers $\overline{D}_P$ which effect a smooth transition from the distance portion FT to the near portion NT. The surface is divided into a temporal portion and a nasal portion by a principal meridian M which forms an umbilical line, or umbilical point line.

At the bottom of FIG. 1 toward the transitional region PB, the distance portion FT is limited by a line of constant average surface refractive powers $\overline{D}_{F0}$; at the top of the progression region $P_B$, the near portion NT is limited by a line of constant average surface refractive powers $\overline{D}_{N0}$.

The amount of the increase of the surface power between the far reference point $B_F$ and the near reference point $B_N$ is denoted by A. Accordingly, $A = \overline{D}_N(B)_N - \overline{D}_F(B_F)$.

A surface power D is defined as usual, namely by $$D = \frac{n' - n}{r} \, [dpt] \tag{1}$$

wherein
 n = refractive index in front of the surface (air),
 n'' = refractive index behind the surface (the lens material),
 r = radius of curvature at the respective surface point in the respective tangential direction.

The surface astigmatism is also defined as usual, namely by $$\Delta D = (n' - n)\left(\frac{1}{r_1} - \frac{1}{r_2}\right) \tag{2}$$

wherein
 $r_1$, $r_2$ = principal radii of curvature in the respective surface points,
 n = refractive index in front of the surface (air),
 n' = refractive index behind the surface (lens material).

The average surface refractive power is also defined as usual, namely by $$\overline{D} = \frac{1}{2}\left(\frac{1}{r_1} + \frac{1}{r_2}\right)(n' - 1) \tag{3}$$

FIG. 2 shows an example for the curve of the surface refractive power along the principal meridian M. FIG. 2 shows the difference of the surface powers between $B_N$ and $B_F$ which equals A.

The surface according to the invention is described in the following in a cylindrical system of coordinates y,ρ,φ, as indicated in FIG. 3. The y-axis is located in a plane which can be imagined as being constructed above the surface, namely essentially underneath the principal meridian M. In this regard, attention must be paid to the fact that it is not at all necessary to be able to project the principal meridian M on the y-axis by means of parallel projection. On the contrary, the principal meridian M may be curved, as it is shown in FIG. 1. From each point of the y-axis, a line can be drawn perpendicularly relative to the y-axis which line extends to the principal meridian and defines a point $P(y,\rho_M,0)$ on the principal meridian. By turning this line about the y-axis by an angle φ, a piercing point through the area $P(y,\rho,\phi)$ is obtained. The distance of the piercing points from the y-axis is $\rho_M$ or ρ, respectively. If the principal meridian M is curved, the y-axis of the system of coordinates must be curved accordingly; the following formulas can then be used unchanged.

FIGS. 3A and 3B illustrate a front and sectional view of a lens embodying the invention, and have surfaces $S_1$ and $S_2$.

According to a feature of the invention, using a cylindrical system of coordinates (y,ρ,φ), the surface S, fits the following equation:

$$\rho(\phi, y) = \sum_{n=0}^{\infty} a_n(y) \cos[n\, k(y)\phi] \quad (4)$$

wherein all $a_n(y)$ are chosen such that ρ(0,y) is an umbilical point line (or umbilical line) and describes the curve. f(y) of the principal meridian M; k(y) is a function which monotonously, preferably in the range of 3 to 10, ascends from the near portion NT to the distance portion FT, or k(y) is a number which is constant, preferably in the range of 3 to 10, over the entire surface, and the curve of the curvature of the principal meridian (M)

$$F(y) = \frac{f''(y)}{(1+f'^2(y))^{3/2}} \quad (5)$$

fits the equation $$F(y) = A[1-(1+e^{-c(y+d)})^{-m}] \quad (6)$$

wherein $$A = \overline{D}_N - \overline{D}_F$$

and the numbers c, d, m are chosen so that the far reference point $B_F$ is located 6 mm above a center point 0 of the surface so that, above the far reference point $B_F$, the average surface refractive power $\overline{D}_F$ along the principal meridian M is constant up to ±0.05 diopters, so that the near reference point $B_N$ is located 12 mm below the geometric center point 0 of the surface, and so that, below the near reference point $B_N$, the average surface refractive power $\overline{D}_N$ along the principal meridian M is constant up to ±0.05 diopters.

By definition, the lower boundary of the distance portion FT is a line of constant average surface power $\overline{D}_{F0}$ which fits the formula $$D_{F0} = S'_{F0} 0.12[dpt]$$

and, by definition, the upper boundary of the near portion NT is a line of constant average surface power $D_{N0}$ which fits the formula $$\overline{D}_{N0} = S'_{N0} - 0.12[dpt]$$

All $a_n(y)$, with $n \geq 2$, which are essentially zero are preferred.

This equation for ρ(φ,y) then reads $$\rho(\phi,y) = a_0(y) + a_1(y)\cos[k(y)\phi]$$

Since for φ=0 this function must describe the principal meridian, the following must hold $$\rho(0,y) = f(y)$$

and since the principal meridian should be an umbilical point line, the coefficients $a_0(y)$ and $a_1(y)$, when calculated, result in $$a_0(y) = f(y) + \frac{g}{k^2(y)}\;; \quad a_1(y) = -\frac{g}{k^2(y)}$$

wherein $$g = \rho_{\phi\phi}(0,y) = f(y) + \frac{f(y)^2 \cdot f''(y)}{1 + f'(y)^2}$$

If k(y) is chosen within the above-mentioned limits to be constant over the entire surface, to wit, independent of y, the solution of the above-mentioned task results in a relatively very large distance portion FT compared to the near portion NT when k is relatively large, and a very large near portion NT in relation to the distance portion FT when k is relatively small.

Accordingly, when k is made independent of y, to wit, when k=k(y) holds within the aforementioned range, a relatively large near portion is obtained and, in addition, especially small surface astigmatism values can be obtained in the progression region.

The surface is such that if $\rho(0,y) = r_F$ in the far reference point $B_F$, an eminently large distance-vision portion is obtained. If $\rho(0,y) = r_N$ in the near reference point $B_N$, a particularly large near-vision portion is obtained. The above-stated conditions for ρ(0,y) ensure especially small surface astigmatism values in the progression region.

FIG. 4 illustrates a preferred curve of a(y), in the surface S, of the invention, for A=3 and $r_F$=8 cm, and FIG. 5 illustrates a preferred curve of k(y), in a lens embodying the invention, for all values of A. In both FIGS. 4 and 5, ρ(φ,y) is determined from $$\rho(\phi,y)\cos\phi = \rho^*(\phi^*,y)\cos\phi^* + (r_F - a(y))$$

and $$\rho(\phi,y)\sin\phi = \rho^*(\phi^*,y)\sin\phi^*$$

wherein $$\rho^*(\phi^*,y) = f^*(y) +$$

$$\frac{1}{k^2(y)}\left(f^*(y) + \frac{f^{*2}(y)f''(y)}{1+f'^2(y)}\right)(1-\cos[k(y)\phi^*])$$

wherein
f(y)=ρ(0,y) curve of principal meridian M
f*(y)−f(y)−($r_F$−a(y))

$r_F$=radius of curvature of said surface in the far reference point $B_F$ $r_N$=radius of curvature of said surface in the near reference point $B_N$ $$a(y) = \left[ \frac{1}{r_F} + \frac{(1 + e^{c_o(y-d_o)})^{-m_o}}{\frac{3}{A} 100 (n' - n)} \right]^{-1}$$

wherein $c_o$, $d_o$, $m_o$, are chosen so that a(y) for $y \geq 6$ mm, up to ±5%, or preferably ±2%, corresponds to its asymptote value for $y \to +\infty$, for $y \leq -12$ mm, up to ±5%, or preferably ±2%, corresponds to its asymptote value for $y \to -\infty$, these two asymptote values are between $r_N$ and $r_F$, or preferably between $5/4 r_N$ and $r_F$, and, when these asymptote values are chosen to be different, the smaller value is assigned to the range $y \leq -12$ mm, particularly
$c_o = 3$
$d_o = 1$
$m_o = 30$ and k(y) up to ±5%, or preferably ±2%, $$= 3 + \frac{7}{1 + e^{-3(y+1,8)}}, y \text{ in [cm]}.$$

The curve in FIG. 6 illustrates the value F(y) in a lens embodying the invention, for example the lenses whose curves are shown in FIGS. 4 and 5. In the lens whose values of F(y) are shown in FIG. 6, $$(0,y)^{-1} = f(y)^{-1}$$

up to ±5%, or preferably ±2%

$$= \frac{1}{r_F} + \frac{A(1 + e^{c(y-d)})^{-m}}{300 (n' - n)} \quad [\text{cm}^{-1}]$$

wherein the values of A, c, d, m are taken from the following table:

| A | c [cm⁻¹] | d [cm] | m |
|---|---|---|---|
| 1,0 | 2,29 | 2,19 | 30 |
| 1,5 | 2,59 | 2,02 | 30 |
| 2,0 | 2,80 | 1,93 | 30 |
| 2,5 | 2,96 | 1,87 | 30 |
| 3,0 | 3,09 | 1,82 | 30 | and the numerical values of c, d, m must be interpolated for intermediate values of A.

Figure 8:
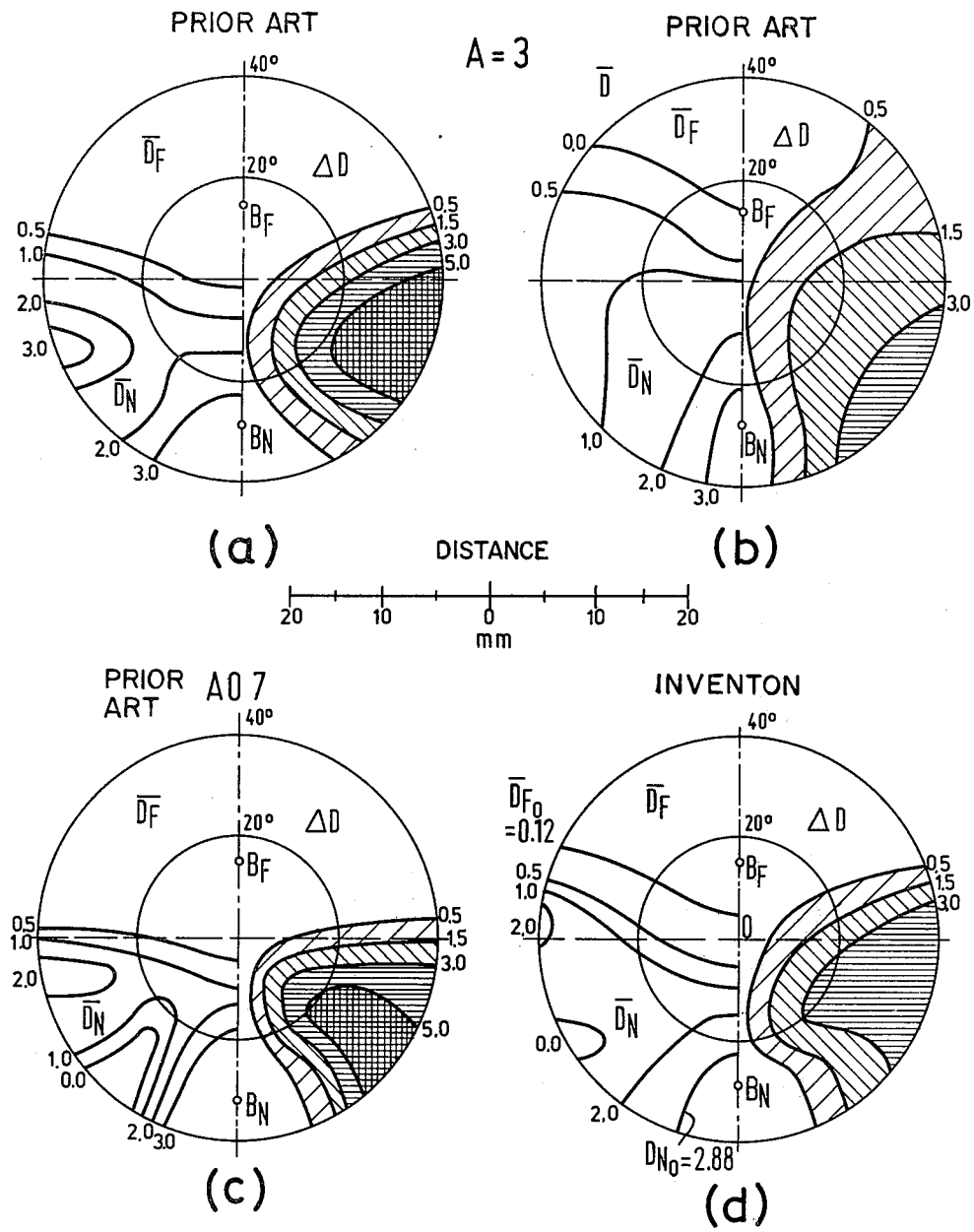
FIGS. 8a, 8b, 8c, and 8d are diagrams comparing three known lens surfaces, shown in FIGS. 8a, 8b, and 8c, with a surface embodying the invention, shown in 8d.

FIGS. 7a, 7b, 7c, and 7d show for the value A=1, and FIGS. 8a, 8b, 8c, and 8d, show for the value A=3 the curves of the average surface refractive power and the curve of the surface astigmatism of known surfaces, namely three lenses available under the Trademarks "Progressiv" (FIGS. 7a and 8a), "Varilux 2" (FIGS. 7b and 8b), and "A07" (FIGS. 7c and 8c), and the lens L embodying the invention (FIGS. 7d and 8d). These curves are illustrated for the purpose of comparison of the prior art in FIGS. 7a, 7b, 7c, 8a, 8b, and 8c, to the invention in FIGS. 7d and 8d. The circles shown are circles of constant deflection of the eyeball relative to the principal line of sight straight ahead. The geometric relation to the cylindrical coordinates y, $\rho$, $\phi$ which describe the surface is given by the relationship $$\sin \sigma = \rho \sin \phi / \sqrt{[\rho_o - (b'+d)]^2 + \rho^2 - 2\rho[\rho_o - (b'+d)] \cos \phi}$$

wherein
b'=distance of the center of rotation of the eyeball from the vertex of the lens on the side of the eye in accordance with DIN 58205,
d=center thickness of the lens,
$\rho_o = \rho(0,0)$ distance of the point 0 of the y-axis.

The outer circle of 40° in each case surrounds the principal field of view.

The following must be taken into consideration when comparing the surfaces of FIGS. 7a, 7b, 7c, and 7d and FIGS. 8a, 8b, 8c, and 8d.

The extent of the surface astigmatism is a measure of the lack of sharpness which is presented to the eyeglass wearer when he focuses on an object through the point of the glass which has the surface astigmatism. According to experience, a surface astigmatism of 0.5 diopters which in its lack of sharpness corresponds to a deficient spherical correction of 0.25 diopters is not perceived as very bothersome.

The pattern of the lines of equal average surface powers illustrates the change of the effect over the surface. The more irregular the lines are and the more densely they are crowded together, the larger become the distortions which are perceived by the eyeglass wearer as "swinging movements" (Shaukelbewegungen) or "vertigo" (i.e. feelings of vertigo). On the other hand, those regions of the surfaces in which the lines of equal average surface power have a relatively large distance between each other lead to small distortions of this type.

In the surfaces "Progressiv" (FIGS. 7a and 8a) the optically satisfactory distance portion and near portion are relatively large, however, the peripheral progression area has surface astigmatism values which are too high and excessive irregularities in the average surface power, particularly an excessive gradient in the horizontal direction; this leads to the bothersome "swinging movement". By means of the invention FIGS. 7d and 8d, the "peak" of the surface astigmatism is reduced to a bearable degree and, simultaneously, the lines of equal average surface power assume a pattern such that practically no dynamic distortions which are perceived as "swinging movements" can occur during movements of the eyeball.

In comparing the invention to lenses with known surfaces, the following must be noted:

(a) The surfaces according to the invention have a large distance vision portion which is free of surface astigmatism. Since the lines of equal average surface powers do not extend too far into the distance portion, the refraction correctness is ensured while looking at the distance.

(b) The near vision is especially large. Accordingly, for looking at reading distance an especially large near portion exists.

The increase of the average surface power from the near portion to the distance portion extends into the surface field of vision through a range of 18 mm and adjusts easily from distance vision to near vision during a normal downward change of the direction of view. Peripherally, the surface astigmatism does not reach very high values. When A=3, it remains under 5.0 diopters, so that, while looking through the peripheral regions, the lack of sharpness is significantly lower than in the known surfaces in which surface astigmatism values of up to 8.0 or 7.0 diopters are obtained. The lines of equal average surface refractive power have a very uniform pattern. The principal field of vision contains "islands" only at the outermost edge. The gradient in horizontal direction is so low that no or only insignificant "swinging movements" occur during changes in the direction of view.

Although only examples for A=1 and A=3 are stated, merely by following the teaching of the invention similar favorable patterns of the lines of equal average surface refractive powers and equal surface astigmatisms can be obtained for other values of A.

| $\bar{D}$ | | | | | | | x [mm] | D | | | | | | |
|---|---|---|---|---|---|---|---|---|---|---|---|---|---|---|
| −24 | −20 | −16 | −12 | −8 | −4 | 0 | | 0 | 4 | 8 | 12 | 16 | 20 | 24 |
| | | | | | | | y [mm] | | | | | | | |
| | | | | 6.01 | 6.00 | 6.00 | 24 | 0.00 | 0.01 | 0.02 | | | | |
| | | 6.04 | 6.02 | 6.01 | 6.00 | 6.00 | 20 | 0.00 | 0.01 | 0.02 | 0.04 | 0.06 | | |
| | 6.06 | 6.04 | 6.03 | 6.02 | 6.01 | 6.00 | 16 | 0.00 | 0.01 | 0.02 | 0.03 | 0.04 | 0.05 | |
| | 6.09 | 6.07 | 6.05 | 6.03 | 6.01 | 6.01 | 12 | 0.00 | 0.02 | 0.03 | 0.04 | 0.04 | 0.03 | |
| 6.23 | 6.20 | 6.16 | 6.12 | 6.07 | 6.04 | 6.03 | 8 | 0.00 | 0.07 | 0.14 | 0.20 | 0.25 | 0.30 | 0.32 |
| 6.64 | 6.58 | 6.47 | 6.34 | 6.21 | 6.12 | 6.09 | 4 | 0.00 | 0.23 | 0.48 | 0.74 | 0.97 | 1.16 | 1.27 |
| 7.73 | 7.57 | 7.28 | 6.94 | 6.62 | 6.39 | 6.31 | 0 | 0.00 | 0.74 | 1.51 | 2.29 | 3.01 | 3.57 | 3.87 |
| 9.26 | 8.62 | 8.24 | 7.78 | 7.35 | 7.04 | 6.93 | −4 | 0.00 | 1.85 | 3.56 | 5.02 | 6.16 | 6.93 | 8.30 |
| 4.03 | 4.65 | 5.37 | 6.33 | 7.24 | 7.89 | 8.13 | −8 | 0.00 | 2.35 | 4.12 | 4.91 | 5.18 | 3.67 | 1.56 |
| | 3.33 | 4.78 | 6.09 | 7.52 | 8.56 | 8.94 | −12 | 0.00 | 0.54 | 0.97 | 1.22 | 1.61 | 1.80 | |
| | 6.53 | 7.00 | 7.60 | 8.29 | 8.81 | 9.00 | −16 | 0.00 | 0.37 | 1.37 | 2.74 | 3.91 | 5.19 | |
| | | 6.96 | 7.57 | 8.28 | 8.80 | 9.00 | −20 | 0.00 | 0.39 | 1.45 | 2.87 | 4.10 | | |
| | | | | 8.24 | 8.79 | 9.00 | −24 | 0.00 | 0.41 | 1.52 | | | | |

A = 3.0  
k = const = 10  
a = const  
$r_F$ = 8.68

| $\bar{D}$ | | | | | | | x [mm] | ΔD | | | | | | |
|---|---|---|---|---|---|---|---|---|---|---|---|---|---|---|
| −24 | −20 | −16 | −12 | −8 | −4 | 0 | | 0 | 4 | 8 | 12 | 16 | 20 | 24 |
| | | | | | | | y [mm] | | | | | | | |
| | | | | 6.28 | 6.07 | 6.00 | 24 | 0.00 | 0.14 | 0.55 | | | | |
| | | 6.41 | 6.31 | 6.27 | 6.07 | 6.00 | 20 | 0.00 | 0.13 | 0.52 | 0.59 | 0.96 | | |
| | 6.89 | 6.60 | 6.24 | 6.26 | 6.07 | 6.01 | 16 | 0.00 | 0.13 | 0.49 | 0.55 | 0.88 | 1.33 | |
| | 6.97 | 6.46 | 6.31 | 6.28 | 6.08 | 6.02 | 12 | 0.00 | 0.12 | 0.45 | 0.53 | 0.74 | 1.11 | |
| 7.68 | 7.30 | 6.68 | 6.45 | 6.37 | 6.13 | 6.05 | 8 | 0.00 | 0.15 | 0.41 | 0.45 | 0.52 | 0.67 | 0.69 |
| 8.97 | 8.25 | 7.65 | 6.95 | 6.64 | 6.29 | 6.17 | 4 | 0.00 | 0.42 | 0.80 | 1.33 | 1.84 | 2.19 | 2.80 |
| 11.81 | 10.48 | 9.21 | 7.83 | 7.32 | 6.74 | 6.55 | 0 | 0.00 | 1.23 | 2.45 | 4.44 | 5.72 | 7.43 | 9.36 |
| 10.72 | 9.88 | 9.04 | 8.52 | 7.97 | 7.61 | 7.49 | −4 | 0.00 | 2.42 | 4.65 | 6.78 | 8.88 | 10.53 | 11.78 |
| 2.19 | 1.33 | 4.63 | 6.27 | 7.57 | 8.39 | 8.68 | −8 | 0.00 | 1.69 | 3.80 | 6.50 | 9.72 | 16.60 | 23.09 |
| | 8.02 | 8.34 | 8.60 | 8.82 | 9.00 | 9.00 | −12 | 0.00 | 0.12 | 0.40 | 0.82 | 1.36 | 1.97 | |
| | 9.00 | 9.00 | 9.00 | 9.00 | 9.00 | 9.00 | −16 | 0.00 | 0.00 | 0.00 | 0.10 | 0.01 | 0.01 | |
| | | 9.00 | 9.00 | 9.00 | 9.00 | 9.00 | −20 | 0.00 | 0.00 | 0.01 | 0.01 | 0.01 | | |
| | | | | 9.00 | 9.00 | 9.00 | −24 | 0.00 | 0.01 | 0.01 | | | | |

A = 3.0  
k = const = 3  
a = const  
$r_N$ = 5.84

| $\bar{D}$ | | | | | | | x [mm] | ΔD | | | | | | |
|---|---|---|---|---|---|---|---|---|---|---|---|---|---|---|
| −24 | −20 | −16 | −12 | −8 | −4 | 0 | | 0 | 4 | 8 | 12 | 16 | 20 | 24 |
| | | | | | | | y [mm] | | | | | | | |
| | | | | 6.00 | 6.00 | 6.00 | 24 | 0.00 | 0.00 | 0.00 | | | | |
| | | 6.00 | 6.00 | 6.00 | 6.00 | 6.00 | 20 | 0.00 | 0.00 | 0.00 | 0.01 | 0.01 | | |
| | 6.01 | 6.01 | 6.01 | 6.01 | 6.00 | 6.00 | 16 | 0.00 | 0.01 | 0.01 | 0.02 | 0.03 | 0.03 | |
| | 6.05 | 6.04 | 6.03 | 6.02 | 6.01 | 6.01 | 12 | 0.00 | 0.02 | 0.04 | 0.07 | 0.09 | 0.11 | |
| 6.19 | 6.17 | 6.14 | 6.10 | 6.06 | 6.04 | 6.03 | 8 | 0.00 | 0.07 | 0.15 | 0.23 | 0.32 | 0.39 | 0.43 |
| 7.99 | 7.27 | 6.76 | 6.43 | 6.23 | 6.13 | 6.09 | 4 | 0.00 | 0.24 | 0.56 | 1.02 | 1.73 | 2.77 | 4.22 |
| 8.61 | 8.12 | 7.60 | 7.10 | 6.68 | 6.41 | 6.31 | 0 | 0.00 | 0.77 | 1.69 | 2.83 | 4.14 | 5.54 | 6.91 |
| 7.25 | 7.93 | 8.09 | 7.86 | 7.44 | 7.08 | 6.93 | −4 | 0.00 | 1.84 | 3.51 | 4.77 | 5.32 | 4.96 | 3.77 |
| 4.93 | 6.00 | 5.72 | 6.55 | 7.35 | 7.93 | 8.13 | −8 | 0.00 | 2.33 | 3.99 | 4.56 | 3.99 | 3.35 | 2.06 |
| | 4.36 | 6.00 | 6.37 | 7.62 | 8.58 | 8.94 | −12 | 0.00 | 0.54 | 0.97 | 1.25 | 2.40 | 1.92 | |
| | 7.20 | 7.60 | 7.81 | 8.38 | 8.83 | 9.00 | −16 | 0.00 | 0.33 | 1.20 | 2.30 | 2.64 | 3.71 | |
| | | 7.39 | 7.79 | 8.37 | 8.83 | 9.00 | −20 | 0.00 | 0.35 | 1.27 | 2.43 | 3.20 | | |

-continued

| $\overline{D}$ | | | | | | | x [mm] | $\Delta D$ | | | | | | |
|---|---|---|---|---|---|---|---|---|---|---|---|---|---|---|
| −24 | −20 | −16 | −12 | −8 | −4 | 0 | | 0 | 4 | 8 | 12 | 16 | 20 | 24 |
| | | | | 8.33 | 8.82 | 9.00 | −24 | 0.00 | 0.37 | 1.34 | | | | |

A = 3.0
$$k(y) = 3 + \frac{7}{1 + e^{-3(y+1.8)}}$$
$$a(y) = \frac{52.5}{6 + (1 + e^{-3(y-1)-30})}$$

| $\overline{D}$ | | | | | | | x [mm] | $\Delta D$ | | | | | | |
|---|---|---|---|---|---|---|---|---|---|---|---|---|---|---|
| −24 | −20 | −16 | −12 | −8 | −4 | 0 | | 0 | 4 | 8 | 12 | 16 | 20 | 24 |
| | | | | | | | y [mm] | | | | | | | |
| | | | | 6.01 | 6.00 | 6.00 | 24 | 0.00 | 0.00 | 0.02 | | | | |
| | | | 6.04 | 6.03 | 6.01 | 6.01 | 20 | 0.00 | 0.01 | 0.02 | 0.04 | 0.06 | | |
| | | 6.06 | 6.05 | 6.03 | 6.02 | 6.01 | 16 | 0.00 | 0.01 | 0.02 | 0.03 | 0.04 | 0.05 | |
| | | 6.08 | 6.07 | 6.05 | 6.03 | 6.02 | 12 | 0.00 | 0.02 | 0.04 | 0.05 | 0.05 | 0.03 | |
| 6.16 | 6.14 | 6.12 | 6.09 | 6.06 | 6.04 | 6.03 | 8 | 0.00 | 0.06 | 0.11 | 0.14 | 0.17 | 0.18 | 0.19 |
| 6.29 | 6.27 | 6.23 | 6.17 | 6.12 | 6.09 | 6.08 | 4 | 0.00 | 0.13 | 0.26 | 0.37 | 0.46 | 0.52 | 0.55 |
| 6.51 | 6.47 | 6.40 | 6.33 | 6.25 | 6.20 | 6.18 | 0 | 0.00 | 0.30 | 0.57 | 0.81 | 0.99 | 1.11 | 1.74 |
| 6.54 | 6.52 | 6.49 | 6.45 | 6.42 | 6.40 | 6.39 | −4 | 0.00 | 0.53 | 0.93 | 1.33 | 1.53 | 1.63 | 1.65 |
| 5.75 | 5.85 | 6.03 | 6.26 | 6.40 | 6.65 | 6.70 | −8 | 0.00 | 0.60 | 1.07 | 1.30 | 1.27 | 1.00 | 0.69 |
| | 5.35 | 5.70 | 6.13 | 6.54 | 6.84 | 6.95 | −12 | 0.00 | 0.26 | 0.46 | 0.55 | 0.51 | 0.35 | |
| | 6.03 | 6.23 | 6.50 | 6.75 | 6.93 | 6.70 | −16 | 0.00 | 0.10 | 0.38 | 0.75 | 1.14 | 1.41 | |
| | | 6.32 | 6.55 | 6.77 | 6.94 | 7.00 | −20 | 0.00 | 0.12 | 0.45 | 0.91 | 1.37 | | |
| | | | | 6.77 | 6.94 | 7.00 | −24 | 0.00 | 0.13 | 0.47 | | | | |

A = 1.0
k = const = 10
a = const
$r_F$ = 8.68

| $\overline{D}$ | | | | | | | x [mm] | $\Delta D$ | | | | | | |
|---|---|---|---|---|---|---|---|---|---|---|---|---|---|---|
| −24 | −20 | −16 | −12 | −8 | −4 | 0 | | 0 | 4 | 8 | 12 | 16 | 20 | 24 |
| | | | | | | | y [mm] | | | | | | | |
| | | | | 6.06 | 6.02 | 6.00 | 24 | 0.00 | 0.03 | 0.12 | | | | |
| | | 6.22 | 6.13 | 6.06 | 6.02 | 6.00 | 20 | 0.00 | 0.03 | 0.11 | 0.24 | 0.42 | | |
| | 6.22 | 6.23 | 6.13 | 6.06 | 6.02 | 6.00 | 16 | 0.00 | 0.03 | 0.10 | 0.22 | 0.38 | 0.32 | |
| | 6.08 | 6.28 | 6.17 | 6.09 | 6.04 | 6.00 | 12 | 0.00 | 0.04 | 0.10 | 0.19 | 0.30 | 0.15 | |
| 6.44 | 6.53 | 6.39 | 6.24 | 6.14 | 6.07 | 6.05 | 8 | 0.00 | 0.09 | 0.17 | 0.25 | 0.32 | 0.48 | 0.48 |
| 7.11 | 6.83 | 6.60 | 6.40 | 6.25 | 6.15 | 6.12 | 4 | 0.00 | 0.20 | 0.40 | 0.59 | 0.76 | 1.25 | 1.43 |
| 7.64 | 6.61 | 6.89 | 6.63 | 6.43 | 6.31 | 6.27 | 0 | 0.00 | 0.42 | 0.83 | 1.22 | 1.59 | 3.06 | 2.21 |
| 5.74 | 6.93 | 6.81 | 6.70 | 6.61 | 6.56 | 6.54 | −4 | 0.00 | 0.63 | 1.22 | 1.75 | 2.18 | 2.49 | 4.36 |
| 5.35 | 5.75 | 6.12 | 6.43 | 6.66 | 6.80 | 6.85 | −8 | 0.00 | 0.49 | 1.02 | 1.61 | 2.27 | 2.99 | 3.75 |
| | 6.28 | 6.52 | 6.72 | 6.87 | 6.96 | 6.90 | −12 | 0.00 | 0.11 | 0.31 | 0.60 | 0.98 | 1.44 | |
| | 6.97 | 6.98 | 7.00 | 7.00 | 7.00 | 7.00 | −16 | 0.00 | 0.00 | 0.01 | 0.02 | 0.02 | 0.04 | |
| | | 7.00 | 7.00 | 7.00 | 7.00 | 7.00 | −20 | 0.00 | 0.00 | 0.00 | 0.00 | 0.01 | | |
| | | | 7.00 | 7.00 | 7.00 | 7.00 | −24 | 0.00 | 0.00 | 0.00 | | | | |

A = 1.0
k = const = 3
a = const
$r_N$ = 7.52

While embodiments of the invention have been described in detail, it will be obvious to those skilled in the art that the invention may be otherwise embodied without departing from the spirit and scope.

We claim:

1. A lens for eyeglasses, comprising a surface having an upper distance vision portion FT containing a far reference point $B_F$ and given average distance-vision portion surface refractive powers $\overline{D}_F$, said surface having a lower near-vision portion NT containing a near reference point $B_N$ given average near-vision surface refractive powers $\overline{D}_N$, said surface having a progression region PB located between said distance portion FT and said near portion NT with average surface refractive powers $\overline{D}_P$ which effect a smooth transition from said distance portion FT to said near portion NT, said surface being divided into a temporal portion and a nasal portion by a principal meridian M which forms an umbilical point line, characterized in that said surface fits the following equation in a cylindrical system of coordinates (y, ρ, φ):

$$\rho(\phi,y) = \sum_{n=0}^{\infty} a_n(y) \cos[n \, k(y)\phi]$$

wherein all $a_n(y)$ are chosen such that $\rho(0,y)$ is an umbilical point line and describes the curve f(y) of the principal meridan M, k(y) is a function which monotonously ascends, preferably in the range of 3 to 10 from said near portion NT to said distance portion FT or is a number which is constant, preferably in the range of 3 to 10, over the entire surface, and the curve of the curvature of said principal meridian M $$F(y) = \frac{f''(y)}{(1 + f'^2(y))^{3/2}}$$

fits the equation $$F(y) = A[1-(1+e^{-c(y+d)})^{-m}]$$

wherein $$A = \overline{D}_N - \overline{D}_F$$

and the numbers c, d, m are chosen so that said far reference point $B_F$ is located above a center point 0 of said surface, so that, above the far reference point $B_F$, the average surface power $\overline{D}_F$ along said principal meridian M is constant up to ±0.25 diopters, so that said near reference point $B_N$ is located below said center point 0 of said surface, and so that, below said near reference point $B_N$, the average surface power $\overline{D}_N$ along said principal meridian M is constant up to ±0.25 diopters.

2. A lens for eyeglasses according to claim 1, characterized in that all $a_n(y)$, with $n \geq 2$, are essentially zero.

3. A lens for eyeglasses according to claim 1, characterized in that $\rho(\phi,y)$ is determined from $$\rho(\phi,y) \cos \phi = \rho^*(\phi^*,y) \cos \phi^* + (r_F - a(y))$$

$$\rho(\phi,y) \sin \phi = \rho^*(\phi^*,y) \sin \phi^*$$

$$\rho^*(\phi^*,y) = f^*(y) + \frac{1}{k^2(y)} \left( f^*(y) + \frac{f^{*2}(y)f''(y)}{1 + f'^2(y)} \right) (1 - \cos[k(y)\phi^*])$$

wherein f(y) = $\rho(0,y)$ curve of principal meridian M
f*(y) = f(y) − ($r_F$ − a(y))
$r_F$ = radius of curvature of said surface in said far reference point $B_F$
$r_N$ = radius of curvature of said surface in said near reference point $B_N$ $$a(y) = \left[ \frac{1}{r_F} + \frac{(1 + e^{c_o(y-d_o)})^{-m_o}}{\frac{3}{A} 100 (n' - n)} \right]^{-1}$$

wherein $c_o$, $d_o$, $m_o$, are chosen such that
a(y) for y ≧ 6 mm ±5% corresponds to its asymptote value for y→+∞,
for y ≦ −12 mm ±5% corresponds to its asymptote value for y→−∞,
these asymptote values are between $r_N$ and $r_F$, and when these asymptote values are chosen to be different, the smaller value is in the range y ≦ −12 mm, particularly
$c_o = 3$
$d_o = 1$
$m_o = 30$
and $K(y)$ up to ± 5%
$= 3 + \frac{7}{1 + e^{-3(y+1,8)}}$, y in [cm].

4. A lens for eyeglasses according to claim 1, characterized in that $\rho(\phi,y)$ is determined from $$\rho(\phi,y) \cos \phi = \rho^*(\phi^*,y) \cos \phi^* + (r_F - a(y))$$

$$\rho(\phi,y) \sin \phi = \rho^*(\phi^*,y) \sin \phi^*$$

$$\rho^*(\phi^*,y) = f^*(y) + \frac{1}{k^2(y)} \left( f^*(y) + \frac{f^{*2}(y)f''(y)}{1 + f'^2(y)} \right) (1 - \cos[k(y)\phi^*])$$

wherein f(y) = $\rho(0,y)$ curve of principal meridian M
f*(y) = f(y) − ($r_F$ − a(y))
$r_F$ = radius of curvature of said surface in said far reference point $B_F$
$r_N$ = radius of curvature of said surface in said near reference point $B_N$ $$a(y) = \left[ \frac{1}{r_F} + \frac{(1 + e^{c_o(y-d_o)})^{-m_o}}{\frac{3}{A} 100 (n' - n)} \right]^{-1}$$

wherein $c_o$, $d_o$, $m_o$, are chosen such that
a(y) for y ≧ 6 mm ±2% corresponds to its asymptote value for y→+∞,
for y ≦ −12 mm ±2% corresponds to its asymptote value for y→−∞,
these asymptote values are between $r_N$ and $r_F$, and when these asymptote values are chosen to be different, the smaller value is in the range y ≦ −12 mm, particularly
$c_o = 3$
$d_o = 1$
$m_o = 30$
and $K(y)$ up to ± 2%
$= 3 + \frac{7}{1 + e^{-3(y+1,8)}}$, y in [cm].

5. A lens for eyeglasses according to claim 1, characterized in that $\rho(\phi,y)$ is determined from $$\rho(\phi,y) \cos \phi = \rho^*(\phi^*,y) \cos \phi^* + (r_F - a(y))$$

$$\rho(\phi,y) \sin \phi = \rho^*(\phi^*,y) \sin \phi^*$$

$$\rho^*(\phi^*,y) = f^*(y) + \frac{1}{k^2(y)} \left( f^*(y) + \frac{f^{*2}(y)f''(y)}{1 + f'^2(y)} \right) (1 - \cos[k(y)\phi^*])$$

wherein
f(y) = $\rho(0,y)$ curve of principal meridian M
f*(y) = f(y) − ($r_F$ − a(y))

$r_F$ = radius of curvature of said surface in said far reference point $B_F$ $r_N$ = radius of curvature of said surface in said near reference point $B_N$ $$a(y) = \left[\frac{1}{r_F} + \frac{(1 + e^{c_o(y-d_o)})^{-m_o}}{\frac{3}{A} 100(n'-n)}\right]^{-1}$$

wherein $c_o$, $d_o$, $m_o$, are chosen such that a(y) for $y \geq 6$ mm±5% corresponds to its asymptote value for $y \to +\infty$, for $y \leq -12$ mm±5% corresponds to its asymptote value for $y \to -\infty$, these asymptote values are between $5r_N/4$ and $r_F$, and when these asymptote values are chosen to be different, the smaller value is in the range $y \leq -12$ mm, particularly $c_o = 3$
$d_o = 1$
$m_o = 30$ and $K(y)$ up to ± 5%
$= 3 + \dfrac{7}{1 + e^{-3(y+1,8)}}$, $y$ in [cm].

6. A lens for eyeglasses according to claim 1, characterized in that $\rho(\phi,y)$ is determined from $\rho(\phi,y) \cos \phi = \rho^*(\phi^*,y) \cos \phi^* + (r_F - a(y))$ $\rho(\phi,y) \sin \phi = \rho^*(\phi^*,y) \sin \phi^*$ $$\rho^*(\phi^*,y) = f^*(y) + \frac{1}{k^2(y)}\left(f^*(y) + \frac{f^{*2}(y)f''(y)}{1 + f'^2(y)}\right)(1 - \cos[k(y)\phi^*])$$

wherein $f(y) = \rho(0,y)$ curve of principal meridian M
$f^*(y) = f(y) - (r_F - a(y))$
$r_F$ = radius of curvature of said surface in said far reference point $B_F$
$r_N$ = radius of curvature of said surface in said near reference point $B_N$ $$a(y) = \left[\frac{1}{r_F} + \frac{(1 + e^{c_o(y-d_o)})^{-m_o}}{\frac{3}{A} 100(n'-n)}\right]^{-1}$$

wherein $c_o$, $d_o$, $m_o$, are chosen such that a(y) for $y \geq 6$ mm±2% corresponds to its asymptote value for $y \to +\infty$, for $y \leq -12$ mm±2% corresponds to its asymptote value for $y \to -\infty$, these asymptote values are between $5r_N/4$ and $r_F$, and when these asymptote values are chosen to be different, the smaller value is in the range $y \leq -12$ mm, particularly $c_o = 3$
$d_o = 1$
$m_o = 30$
and $K(y)$ up to ± 2%
$= 3 + \dfrac{7}{1 + e^{-3(y+1,8)}}$, $y$ in [cm].

7. A lens for eyeglasses according to claim 2, characterized in that $\rho(\phi,y)$ is determined from $\rho(\phi,y) \cos \phi = \rho^*(\phi^*,y) \cos \phi^* + (r_F - a(y))$ $\rho(\phi,y) \sin \phi = \rho^*(\phi^*,y) \sin \phi^*$ $$\rho^*(\phi^*,y) = f^*(y) + \frac{1}{k^2(y)}\left(f^*(y) + \frac{f^{*2}(y)f''(y)}{1 + f'^2(y)}\right)(1 - \cos[k(y)\phi^*])$$

wherein $f(y) = \rho(0,y)$ curve of principal meridian M
$f^*(y) = f(y) - (r_F - a(y))$
$r_F$ = radius of curvature of said surface in said far reference point $B_F$
$r_N$ = radius of curvature of said surface in said near reference point $B_N$ $$a(y) = \left[\frac{1}{r_F} + \frac{(1 + e^{c_o(y-d_o)})^{-m_o}}{\frac{3}{A} 100(n'-n)}\right]^{-1}$$

wherein $c_o$, $d_o$, $m_o$, are chosen such that a(y) for $y \geq 6$ mm±5% corresponds to its asymptote value for $y \to +\infty$, for $y \leq -12$ mm±5% corresponds to its asymptote value for $y \to -\infty$, these asymptote values are between $r_N$ and $r_F$, and when these asymptote values are chosen to be different, the smaller value is in the range $y \leq -12$ mm, particularly $c_o = 3$
$d_o = 1$
$m_o = 30$
and $K(y)$ up to ± 5%
$= 3 + \dfrac{7}{1 + e^{-3(y+1,8)}}$, $y$ in [cm].

8. A lens for eyeglasses according to claim 2, characterized in that $\rho(\phi,y)$ is determined from $\rho(\phi,y) \cos \phi = \rho^*(\phi^*,y) \cos \phi^* + (r_F - a(y))$ $\rho(\phi,y) \sin \phi = \rho^*(\phi^*,y) \sin \phi^*$ $$\rho^*(\phi^*,y) = f^*(y) + \frac{1}{k^2(y)}\left(f^*(y) + \frac{f^{*2}(y)f''(y)}{1 + f'^2(y)}\right)(1 - \cos[k(y)\phi^*])$$

wherein $f(y) = \rho(0,y)$ curve of principal meridian M
$f^*(y) = f(y) - (r_F - a(y))$
$r_F$ = radius of curvature of said surface in said far reference point $B_F$
$r_N$ = radius of curvature of said surface in said near reference point $B_N$ $$a(y) = \left[\frac{1}{r_F} + \frac{(1 + e^{c_o(y-d_o)})^{-m_o}}{\frac{3}{A} 100 (n' - n)}\right]^{-1}$$

wherein $c_o$, $d_o$, $m_o$, are chosen such that
  a(y) for $y \geq 6$ mm $\pm 2\%$ corresponds to its asymptote value for $y \rightarrow +\infty$,
  for $y \leq -12$ mm $\pm 2\%$ corresponds to its asymptote value for $y \rightarrow -\infty$,
  these asymptote values are between $r_N$ and $r_F$, and when these asymptote values are chosen to be different, the smaller value is in the range $y \leq -12$ mm, particularly
  $c_o = 3$
  $d_o = 1$
  $m_o = 30$
and $K(y)$ up to $\pm 2\%$
$= 3 + \dfrac{7}{1 + e^{-3(y+1,8)}}$, $y$ in [cm].

9. A lens for eyeglasses according to claim 2, characterized in that $\rho(\phi,y)$ is determined from $\rho(\phi,y) \cos \phi = \rho^*(\phi^*,y) \cos \phi^* + (r_F - a(y))$ $\rho(\phi,y) \sin \phi = \rho^*(\phi^*,y) \sin \phi^*$ $$\rho^*(\phi^*,y) = f^*(y) + \frac{1}{k^2(y)}\left(f^*(y) + \frac{f^{*2}(y)f''(y)}{1 + f'^2(y)}\right)(1 - \cos[k(y)\phi^*])$$

wherein
  $f(y) = \rho(0,y)$ curve of principal meridian M
  $f^*(y) = f(y) - (r_F - a(y))$
  $r_F$ = radius of curvature of said surface in said far reference point $B_F$
  $r_N$ = radius of curvature of said surface in said near reference point $B_N$ $$a(y) = \left[\frac{1}{r_F} + \frac{(1 + e^{c_o(y-d_o)})^{-m_o}}{\frac{3}{A} 100 (n' - n)}\right]^{-1}$$

wherein $c_o$, $d_o$, $m_o$, are chosen such that
  a(y) for $y \geq 6$ mm $\pm 5\%$ corresponds to its asymptote value for $y \rightarrow +\infty$,
  for $y \leq -12$ mm $\pm 5\%$ corresponds to its asymptote value for $y \rightarrow -\infty$,
  these asymptote values are between $5r_N/4$ and $r_F$, and when these asymptote values are chosen to be different, the smaller value is in the range $y \leq -12$ mm, particularly
  $c_o = 3$
  $d_o = 1$
  $m_o = 30$
and $K(y)$ up to $\pm 5\%$
$= 3 + \dfrac{7}{1 + e^{-3(y+1,8)}}$, $y$ in [cm].

10. A lens for eyeglasses according to claim 2, characterized in that $\rho(\phi,y)$ is determined from $\rho(\phi,y) \cos \phi = \rho^*(\phi^*,y) \cos \phi^* + (r_F - a(y))$ $\rho(\phi,y) \sin \phi = \rho^*(\phi^*,y) \sin \phi^*$ $$\rho^*(\phi^*,y) = f^*(y) + \frac{1}{k^2(y)}\left(f^*(y) + \frac{f^{*2}(y)f''(y)}{1 + f'^2(y)}\right)(1 - \cos[k(y)\phi^*])$$

wherein
  $f(y) = \rho(0,y)$ curve of principal meridian M
  $f^*(y) = f(y) - (r_F - a(y))$
  $r_F$ = radius of curvature of said surface in said far reference point $B_F$
  $r_N$ = radius of curvature of said surface in said near reference point $B_N$ $$a(y) = \left[\frac{1}{r_F} + \frac{(1 + e^{c_o(y-d_o)})^{-m_o}}{\frac{3}{A} 100 (n' - n)}\right]^{-1}$$

wherein $c_o$, $d_o$, $m_o$, are chosen such that
  a(y) for $y \geq 6$ mm $\pm 2\%$ corresponds to its asymptote value for $y \rightarrow +\infty$,
  for $y \leq -12$ mm $\pm 2\%$ corresponds to its asymptote value for $y \rightarrow -\infty$,
  these asymptote values are between $5r_N/4$ and $r_F$, and when these asymptote values are chosen to be different, the smaller value is in the range $y \leq -12$ mm, particularly
  $c_o = 3$
  $d_o = 1$
  $m_o = 30$
and $K(y)$ up to $\pm 2\%$
$= 3 + \dfrac{7}{1 + e^{-3(y+1,8)}}$, $y$ in [cm].

11. A lens as in claims 1, 2, 3, 4, 5, 6, 7, 8, 9, or 10, wherein $\rho(0,y)^{-1} \equiv f(y)^{-1}$ up to $\pm 5\%$, $= \dfrac{1}{r_F} + \dfrac{4(1 + e^{c(y-d)})^{-m}}{300 (n' - n)}$ [cm$^{-1}$]

wherein the values of A, c, d, m are taken from the following table:

| A | c [cm$^{-1}$] | d [cm] | m |
|---|---|---|---|
| 1,0 | 2,29 | 2,19 | 30 |
| 1,5 | 2,59 | 2,02 | 30 |
| 2,0 | 2,80 | 1,93 | 30 |
| 2,5 | 2,96 | 1,87 | 30 |
| 3,0 | 3,09 | 1,82 | 30 | and the numerical values of c, d, m for intermediate values of A.

12. A lens as in claims 1, 2, 3, 4, 5, 6, 7, 8, 9, or 10, wherein $\rho(0,y)^{-1} \equiv f(y)^{-1}$ up to $\pm 2\%$, $$= \frac{1}{r_F} + \frac{A(1 + e^{c(y-d)})^{-m}}{300 \, (n' - n)} \quad [\text{cm}^{-1}]$$

wherein the values of A, c, d, m are taken from the following table:

| A | c [cm$^{-1}$] | d [cm] | m |
|---|---|---|---|
| 1,0 | 2,29 | 2,19 | 30 |
| 1,5 | 2,59 | 2,02 | 30 |
| 2,0 | 2,80 | 1,93 | 30 |
| 2,5 | 2,96 | 1,87 | 30 |
| 3,0 | 3,09 | 1,82 | 30 | and the numerical values of c, d, m for intermediate values of A.

13. A lens for eyeglasses, comprising a surface having an upper distance vision portion FT containing a far reference point $B_F$ and given average distance-vision portion surface refractive powers $\overline{D}_F$, said surface having a lower near-vision portion NT containing a near reference point $B_N$ given average near-vision surface refractive powers $\overline{D}_N$, said surface having a progression region PB located between said distance portion FT and said near portion NT with average surface refractive powers $\overline{D}_P$ which effect a smooth transition from said distance portion FT to said near portion NT, said surface being divided into a temporal portion and a nasal portion by a principal meridian M which forms an umbilical point line, characterized in that said surface fits the following equation in a cylindrical system of coordinates (y,ρ,φ):

$$\rho(\phi,y) = \sum_{n=0}^{\infty} a_n(y) \cos[n.k(y)\phi]$$

wherein $a_n$ (y) for n>>2 equals zero and ρ(φ,y) is an umbilical point line and the curve f(y) of the principal meridian (M) describes, $$a_o(y) = f(y) + g(y)/k^2(y)$$

$$a_1(y) = -g(y)/k^2(y)$$

$$g(y) = f(y) + \frac{f^2(y) \cdot f'(y)}{1 + f^2(y)}$$

and k(y) is a monotonously ascending function from the near portion (NT) to the distance portion (FT) or a number constant over the entire surface.

14. A lens for eyeglasses as in claim 13, characterized in that the progress of curvature $$F(y) = \frac{f''(y)}{(1 + f^2(y))^{3/2}}$$

of the principal meridian (M) of the equation $$F(y) = A[1 - (1 + e^{-c(y+d)})^{-m}]$$

is sufficient, in which $$A = \overline{D}_N - \overline{D}_F$$

and the values c, d, m are selected such that the far reference point $B_F$ lies 6 mm above the center point 0 of the surface, is constant above the far reference point $B_F$ of the average surface refraction power $\overline{D}_F$ along the principal meridian M up to ±0.05 [dpt], the near reference point ($B_N$) lies 12 mm below the center point 0 of the surface, and below the near reference point ($B_N$) the average surface refraction power $\overline{D}_N$ along the principal meridian (M) is constant up to ±0.05 [dpt].

15. A lens for eyeglasses according to claim 13, characterized in that k(y) lies in the range of 3 to 10.

16. A lens for eyeglasses as in claim 14, characterized in that k(y) lies in the range of 3 to 10.

17. A lens for eyeglasses according to claims 13, 14, 15, or 16, characterized in that $$K(y) \pm 5\% = 3 + \frac{7}{1 + e^{-3(y+1,8)}}, \, y \text{ in [cm]}.$$

18. A lens for eyeglasses according to claims 13, 14, 15 or 16, characterized in that $$k(y) \pm 2\% = 3 + \frac{7}{1 + e^{-3(y+1,8)}}, \, y \text{ in [cm]},$$

19. A lens for eyeglasses according to claim 14, characterized in that for a tolerance range of ±5% for F(y) the parameter values of F(y) can be taken from the following table:

| A | c [cm$^{-1}$] | d [cm] | m |
|---|---|---|---|
| 1,0 | 2,29 | 2,19 | 30 |
| 1,5 | 2,59 | 2,02 | 30 |
| 2,0 | 2,80 | 1,93 | 30 |
| 2,5 | 2,96 | 1,87 | 30 |
| 3,0 | 3,09 | 1,82 | 30, | wherein for intermediate values of A the numerical values of c, d, m are to be interpolated.

20. A lens for eyeglasses according to claim 14, characterized in that for a tolerance range of ±2% for F(y) can be taken from the following table:

| A | c [cm$^{-1}$] | d [cm] | m |
|---|---|---|---|
| 1,0 | 2,29 | 2,19 | 30 |
| 1,5 | 2,59 | 2,02 | 30 |
| 2,0 | 2,80 | 1,93 | 30 |
| 2,5 | 2,96 | 1,87 | 30 |
| 3,0 | 3,09 | 1,82 | 30, | wherein for intermediate values of A the numerical values of c, d, m are to be interpolated.

* * * * *